March 20, 1951
C. MALNATI
2,545,667
APPARATUS FOR SEPARATING CLOSELY ADJACENT STRIPS OF DOUGH
Filed July 26, 1944
3 Sheets-Sheet 3
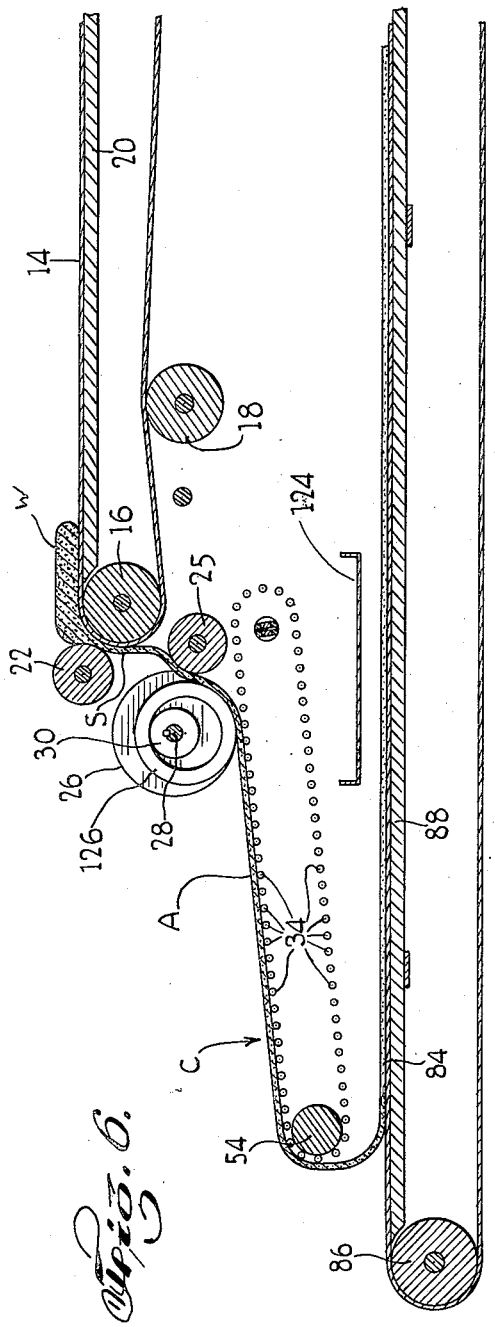
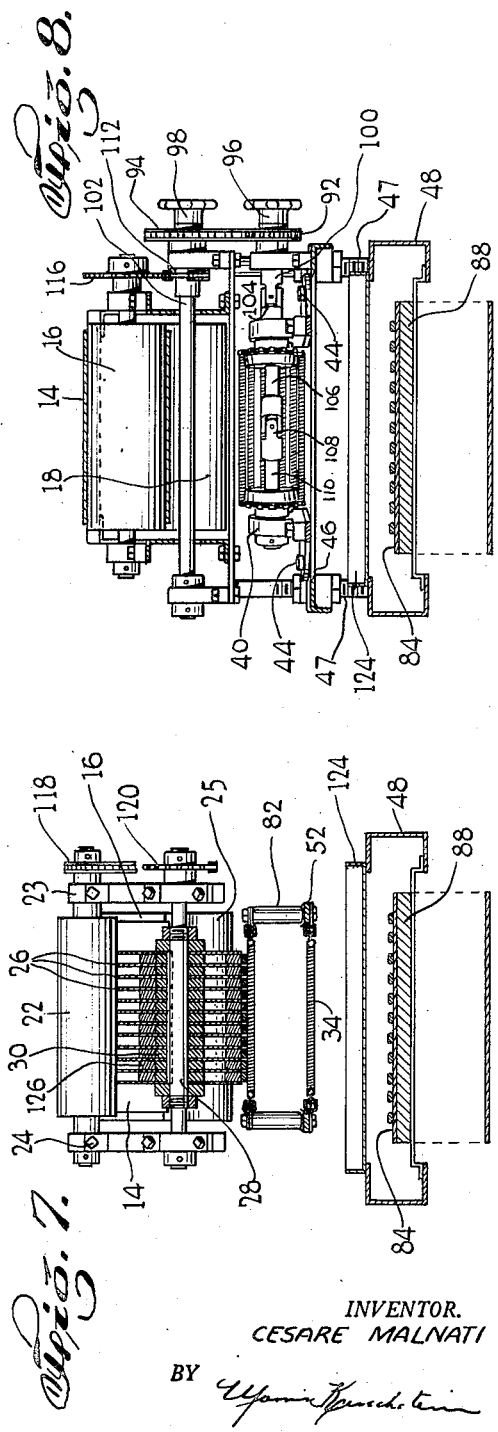
INVENTOR.
CESARE MALNATI
BY
ATTORNEY Patented Mar. 20, 1951

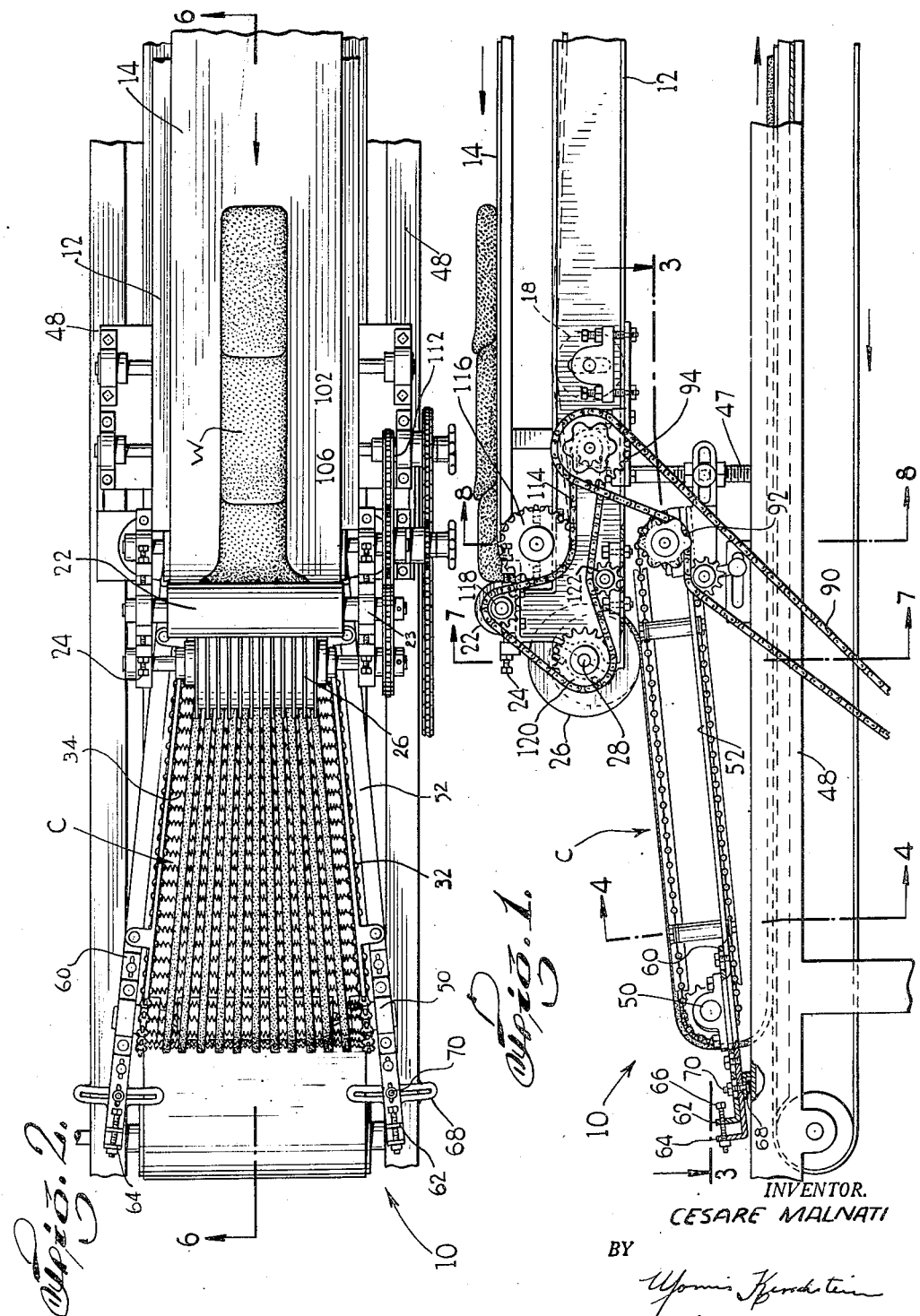

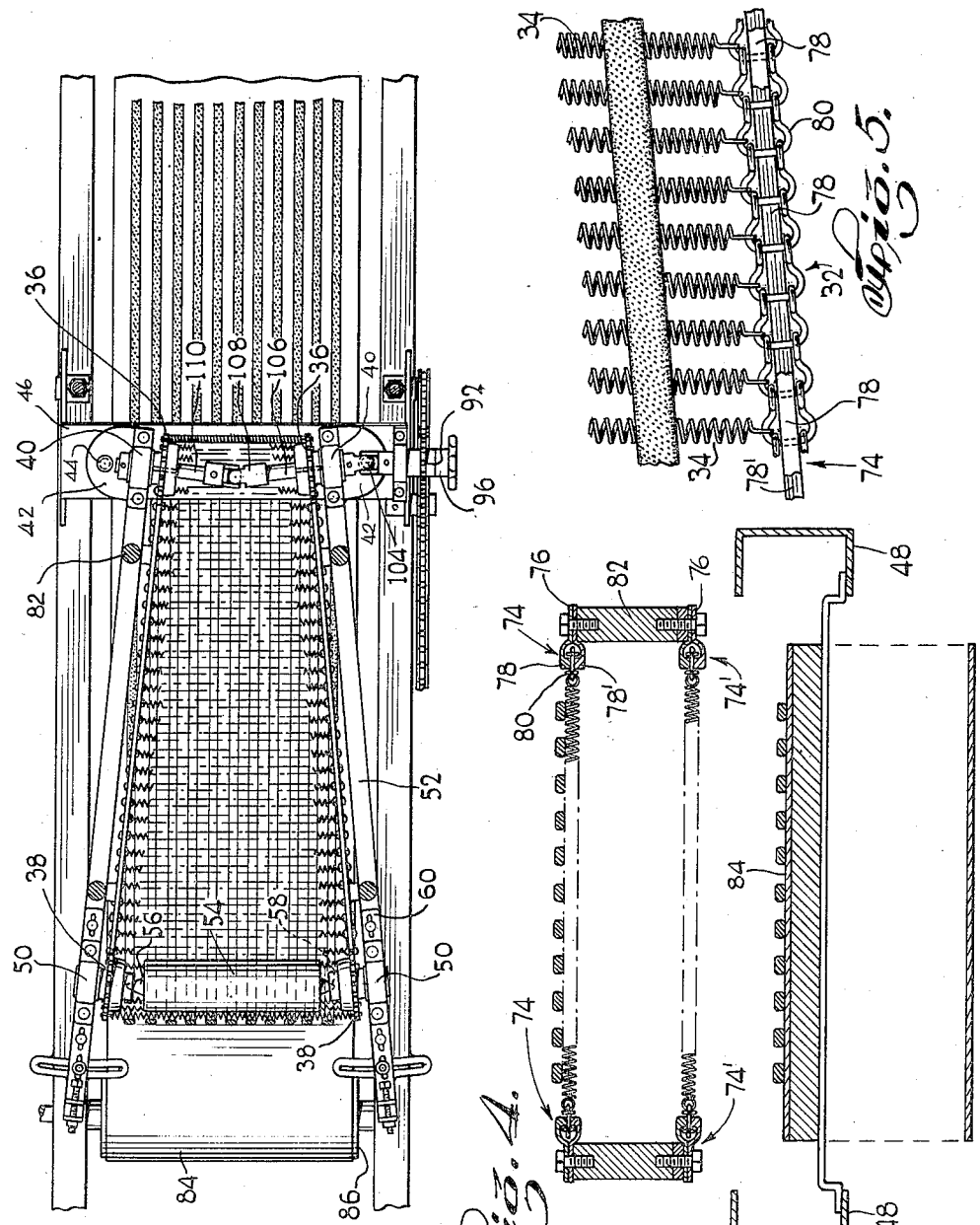

2,545,667

UNITED STATES PATENT OFFICE 2,545,667

APPARATUS FOR SEPARATING CLOSELY ADJACENT STRIPS OF DOUGH

Cesare Malnati, Babylon, N. Y.

Application July 26, 1944, Serial No. 546,720

9 Claims. (Cl. 107—22)

This invention relates to an apparatus and method for forming dough into strips, such as are used, for example, in making breadsticks.

It is an object of the invention to provide an apparatus and method of the character described in which closely spaced elongated strips of dough are separated from each other as they are continuously formed so that they will not run together during subsequent handling or baking.

Another object of the invention is to provide an apparatus and method of the character described which facilitate stripping from the various machine parts of the sticky dough customarily employed in making breadsticks.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a side view of a dough sheeting and strip cutting machine embodying my invention;

Fig. 2 is a top plan view thereof;

Fig. 3 is a sectional view taken substantially along the line 3—3 of Fig. 1;

Fig. 4 is an enlarged sectional view taken substantially along the line 4—4 of Fig. 1;

Fig. 5 is an enlarged detailed view of a fragment of an expansible conveyor belt employed in the machine;

Fig. 6 is a sectional view taken substantially along the line 6—6 of Fig. 2; and Figs. 7 and 8 are sectional views taken substantially along the lines 7—7 and 8—8, respectively, of Fig. 1.

In general, the machine comprises a mechanism for reducing the dough to a sheet of suitable thickness, a mechanism for cutting up the sheet into strips of suitable width, and a mechanism for separating the cut strips to prevent cohesion thereof.

If desired, there also may be associated with the machine a mechanism for transferring the cut and separated strips to a baking oven or the like.

I employ conventional rollers for the sheeting mechanism and ganged, coaxial disc knives for cutting the sheet into elongated strips. However, the dough customarily used for making breadsticks is extremely tacky, that is, it tends to stick to objects with which it comes into contact, and, for such reason, the rollers and cutting discs are specially mounted and driven, pursuant to my invention, to overcome this drawback.

More particularly, the sheeting rollers are disposed in such relative positions and driven at such relative speeds that the dough will tend to strip automatically therefrom after sheeting. In addition, successive rollers and dough-handling mechanisms are driven at progressively faster surface speeds so as to aid in stripping the dough from preceding rollers and mechanisms; and the last of the mechanisms, to wit: the strip separating means, reduces its area of contact with the dough during handling of the same, thus substantially nullifying adhesion of the dough thereto. Furthermore, the strip separating mechanism following the knife discs, by speeding up the rate of travel of the dough as it leaves the discs, attenuates the strips as they are formed and thereby facilitates stripping of the same from said discs.

It may be mentioned that the tendency of the dough to stick to parts of the machine cannot be overcome, when making breadsticks, by applying flour to the surface of the dough as this leaves a highly undesirable finish. Likewise, the stickiness of the dough may not be reduced by increasing the quantities of oil incorporated therein since this too deteriorates from the ultimate high quality of the breadsticks.

By way of illustration and without in any sense limiting my invention to any particular formulae, conventional recipes for making breadstick dough, such as my machine and method are adapted to sheet and cut into strips, are the following:

A suitable amount of flour, the quantity thereof being determined by the desired texture and weight of the breadstick;

One quart of water;

One ounce of shortening (butter);

One ounce of olive oil.

The resulting dough is rather hard and while it has a decided tendency to stick is not as sticky as a "soft dough" in which the amounts of butter and oil are doubled. Both of these doughs, however, are so sticky that they cannot be handled in conventional sheeting and cutting machines without covering the surface thereof with flour, this, as noted above, being undesirable from a commercial viewpoint.

After the dough has been sheeted and cut into strips, the several strips must be separated before they are inserted in an oven or else the strips will cohere and form a baked sheet of dough rather than individual breadsticks. Heretofore, separation has been accomplished by hand. But this has greatly impaired the rate at which strips of dough were prepared and up to now has prevented the use of a machine for continuously sheeting and cutting dough in preparing the same for making breadsticks.

In accordance with the present invention, I have provided a novel mechanical means for separating the strips from each other continuously as the strips are formed so that the operation of the machine need not be interrupted to pull the strips apart by hand. Primarily this is accomplished by depositing the strips, as they are cut, on a transversely extensible supporting and transferring means, e. g., a special conveyor belt, which, as it progresses away from the cutting mechanism, has its width increased transversely of its direction of travel, thus moving apart the elements of the supporting and transferring means on which the several strips were originally deposited and, as a result, moving the strips themselves apart.

Referring now in detail to the drawings, 10 denotes a machine embodying the invention. The sheeting portion of the machine is mounted on side beams 12 and comprises a dough conveyor, such as an endless canvas belt 14, traveling between a roller (not shown) at the back of the machine and another roller 16 (Fig. 6) at the front. Slack is taken up by a vertically adjustable idler roller 18, and a panel 20 of rigid material, e. g. wood, supported by the side beams 12 keeps the upper run of conveyor flat. Large wads W of dough deposited upon the conveyor belt 14 are squeezed into a sheet S by a compression roller 22 spaced a short distance forwardly of the surface of the belt supported on the roller 16. The ends of the roller 22 are journalled in bearing blocks 23 adjustable longitudinally of the machine by screws 24, to vary the spacing between the rollers 16 and 22 and thus adjust the thickness of the sheet of dough.

Since both the belt 14 and roller 22 are moving at approximately the same speed as the dough, the tendency of the dough to stick thereto is minimized. The actual relative speeds of the dough, belt 14 and rollers will be discussed in detail later.

Slack in the conveyor belt is taken up to such an extent by adjustment of the idler roller 18 that said belt will slip if dough is fed to the sheeting rollers faster than it can be formed into sheets.

From the sheeting rollers the sheet S of dough passes to a fiber platen roller 25 which is mounted between the side beams 12 for adjustment longitudinally of the machine. A series of coaxial ganged steel knives 26 keyed to a shaft 28 press lightly on the soft surface of the platen roller and cut the sheet of dough into elongated strips A. Said knives are spaced from each other by collars 30 which may be changed when it is desired to change the diameter of the breadsticks. It will be noted that the knife shaft 28 is permanently journalled in the side beams 12 and the adjustable mounting of the roller 25 relative thereto permits said roller to be pressed lightly against the knives 26.

The strips A of dough leaving the knives are deposited upon a conveyor C specially constructed in accordance with my invention so that as the transfer surface of the conveyor leaves the knives 26, it is stretched transversely. For this purpose the conveyor includes a series of parallel transversely extending expansible elements, such as springs or rubber bands. The transverse stretching means comprises two series of transversely spaced engagable elements, such as holes, in the belt which are engaged by pairs of rotating members, such as sprockets, having different transverse spacing whereby the belt is forced to change its width as it moves between said pairs of members.

In the illustrated construction, the conveyor includes two chains, such as the endless link chains 32 at the two lateral edges of the belt. Helical springs 34 connect opposite links of the chains. At one end of the conveyor the link chains engage a pair of sprockets 36, and at the other end of the conveyor a pair of sprockets 38 which are spaced apart a distance greater than the sprockets 36, so that as the belt approaches the sprockets 38 distant from the knives 26 the belt is widened. This change in width will stretch the springs 34 as they move from the knives towards the sprockets 38 and relax the springs as they travel on the lower reach of the belt towards the sprockets 36. Said stretching is uniform over the length of the individual springs so that the elements on which the strips A of dough are deposited at the knives are moved apart uniformly, causing the strips of dough to diverge as best seen in Fig. 2.

It is desirable to provide means for adjusting the amount that the strips are separated. To this end the conveyor may further be constructed as follows:

Each of the sprockets 36 is journalled in a bearing 40 (Figs. 3 and 8) which is bolted to a base plate 42 rotatably mounted on a pivot 44 projecting from a bed plate 46. Said bed plate is vertically adjustably carried on threaded posts 47 supported by side pieces 48. Pins (not shown) at the upper end of said rods engage the beams 12.

The sprockets 38 are journalled in bearings 50 (Figs. 1 and 3) supported by flat iron bars 52 which are rigidly secured one to each base plate 42. The sprockets 36, 38 associated with each iron bar 52 are in approximate planar alignment and will maintain this alignment, by virtue of the foregoing structure, as the sprockets are moved either towards or away from each other, by turning the bars about the pivots 44. To secure any desired relative spacing of the sprockets 38, I insert therebetween one roller 54 of a set of rollers of different lengths. Said rollers have conical end pieces 56 which are adapted to be received in conical seats 58 on the inside sprocket centers.

The diameter of the roller 54 is about equal to the root diameter of the sprockets 38 so that the roller will support the springs as they pass on to the bottom run of the conveyor. If the roller is not this large, the springs sometimes sag as the strips of dough leave the belt, tending to make the dough stick to the conveyor.

Each iron bar 52 has a shorter iron bar 60 (Fig. 1) secured thereon near the sprockets 38 by pin and slot connections, the adjacent ends of the two bars being turned up to provide ears 62, 64. A screw 66 is threaded into the ear 62 of the bar 60 and is non-shiftably journalled in the ear 64 of the bar 52. Each short bar has one of the bearings 50 bolted thereto, so that rotation of the screws 66 will move the sprockets 38 towards or away from the sprockets 36 to adjust the slack of the conveyor C.

Means may also be provided to retain the bars 52 in any desired relative spaced relationship of the sprockets 38. Such means comprises a slotted sector plate 68 mounted on each of the side pieces 48. A bolt 70 passes through each of the sector plates and is threaded into a nut. The bolt is loosened when the said bars are to be moved to any desired position and tightened to hold them in such position. The ends of the bars 52 may also be vertically adjusted by encircling the bolts 70 with collars of various heights disposed between the sector plates 68 and bottoms of the bars 52.

The divergence of the link chains 32 intermediate the sprockets 36, 38 may be controlled by guides 74 (Figs. 4 and 5), each consisting of a strip 76 suitably supported from the iron bars 52 and a finger 78 which is inserted between the knuckles 80 at the sides of the link chains. One finger 78 is located above the link chain and the corresponding finger 78' of the same guide 74 below the link chain, thus firmly holding the chain in its desired position and at the same time permitting the chain to slide between said fingers. The lower guides 74' have their strips 76 bolted directly to the bar 52 while the upper guides 74 are bolted at intervals to the top of sleeves 82 extending from said bars. These guides, together with the sprockets 36, 38 define fixed predetermined closed paths for the link chains 32 at each side of the conveyor C. After leaving the conveyor, the strips A of dough are deposited on any suitable transferring means which will move them to a baking oven or the like. Such means may comprise another endless canvas conveyor belt 84, whose upper reach is disposed beneath the sprockets 38. Said belt rides over a roller 86 journalled in the side pieces 48 ahead of said sprockets 38 and over another roller (not shown) at the delivery end of the belt. Intermediate these two rollers, the upper reach of the belt is kept flat by an underlying wooden panel 88.

Finally, means is provided to drive the various dough handling rollers and other mechanisms. Said means may be actuated from an electric motor (not shown) which drives a chain 90. The chain engages sprockets 92, 94 on the driven sides of hand-controlled clutches 96, 98 respectively, whose driving sides are connected to upper and lower shafts 100 and 102.

The lower shaft 100 turns a universal joint 104 (Figs. 3 and 8) centered above the closest pivot 44 and is pinned to a shaft 106 which is keyed to one of the sprockets 36. Said shaft 106 is slidably joined by a spline (not shown) to another universal joint 108 midway between the pivots 44, this latter joint being connected by a shaft 110 to the other sprocket 36. The foregoing construction permits the base plates 42 and sprockets 36 carried thereby, to be swung freely about the pivots 44 without interfering with the sprocket drive.

The upper shaft 102 (Figs. 2 and 8) carries a sprocket 112 which is energized upon engaging the clutch 98. Said sprocket drives a chain 114 (Fig. 1) which engages sprockets 116, 118, 120 and 122. Sprocket 116 turns the conveyor and sheeting roller 16; sprocket 118, the sheeting roller 22; sprocket 120, the knife shaft 28; and sprocket 122, the knife platen roller 25.

The sprockets 92, 94, 112, 116, 118, 120 and 122 are so relatively proportioned that the following drive is effected: The surface speed of the sheeting roller 22 is slightly greater than the surface speed of the conveyor and sheeting roller 16. In the illustrated embodiment of the invention, the roller 22 gains about three inches per revolution on the roller 16. This stretches the dough at the same time it is sheeted and minimizes its tendency to stick to the sheeting roller 22 and belt 14.

The platen roller 25 is of the same diameter as the roller 22 but turns about one-sixth faster whereby to tension and further stretch the sheet S of dough. As a result, said sheet is attenuated at its point of emergence between the sheeting rollers, and strips readily and cleanly both from the steel roller 22 and the canvas belt 14.

The peripheral speed of the knives 26 is slightly in excess of that of the fiber platen roller, about one-quarter of an inch a turn. This aids in maintaining tension in the portion of the dough sheet between the sheeting and platen rollers 22 and 25, and, in addition, scrapes scale, dirt and flaked dough from the surface of the platen roller and knives 26. Such rubbish falls through the conveyor C onto a tray 124.

The conveyor C gains about two inches on the knives 26 each turn of the sprockets 36, causing attenuation of the strips A of dough leaving the knives and thus aiding in stripping the dough from the knives. However, since the dough is very tacky, it is preferable to provide additional knife-stripping means.

Pursuant to the instant invention, such means comprises a ring 126 loosely captively riding on the collar 30 between each pair of knives 26. This ring is of such dimensions that when its inner surface rests on a collar, the lower portion of its exterior surface will be spaced from the conveyor C a distance approximately equal to or slightly less than the height of a strip A being cut. Since this ring is rotated by frictional engagement with a collar 30 and strip of dough, it does not tend to cause the dough to adhere thereto.

The foregoing relative speeds of the various dough handling mechanisms have been given by way of example only and it will be understood that these speeds may be widely changed without essentially altering the fundamental concepts of the invention.

It will thus be seen that there is provided an apparatus and method for sheeting and cutting dough in which the several objects of this invention are achieved, and which are well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In a machine of the character described, the combination, with a means for forming sheeted dough into closely adjacent strips, of a transversely resiliently extensible member for receiving the strips, means to move said member away from said strip forming means, and means to transversely stretch said member as it moves away so as to spread articles which are received closely spaced transversely to the movement of the belt.

2. In a machine of the character described, the combination, with a means for continuously forming sheeted dough into closely adjacent strips, of a transversely resiliently extensible endless member, means to move said member through a closed path including a portion at which it receives closely spaced strips and a portion remote therefrom, and means to transversely stretch said member as it moves away from said strip receiving portion.

3. A transversely resiliently extensible endless belt for spreading articles which are received closely spaced transversely to the movement of the belt, means to move said belt through a closed path including a portion at which it receives closely transversely spaced articles and a portion remote therefrom, and means to transversely stretch said belt as it moves away from said article receiving portion.

4. In a machine of the character described, the combination, with a means for continuously forming sheeted dough into closely adjacent strips, of a transversely resiliently extensible endless belt, means comprising two pairs of rolling contact members to define a closed path of travel for said belt including a portion at which it receives closely spaced strips and another portion remote therefrom, the members of one of said pairs of rolling contact members being spaced apart further than those of the other pair, said one pair of rolling contact members being located at said remote portion of the closed path, and means to transversely stretch said belt as it moves from the strip receiving to the remote portion of said path.

5. In a machine of the character described, the combination, with a means for continuously forming sheeted dough into closely adjacent strips, of a transversely resiliently extensible belt having two transversely spaced series of apertures, two pairs of sprockets on which said belt is mounted and which define a closed path for the belt including a portion at which it receives closely spaced strips and another portion remoter therefrom, said sprockets engaging said apertures and one pair of sprockets being spaced apart further than the other whereby to transversely stretch said belt as it is moved from the strip receiving to the remote portion of said path.

6. In a machine of the character described, the combination, with a means for continuously forming sheeted dough into closely adjacent strips, of a transversely resiliently extensible endless belt having two transversely spaced series of engageable elements, revolvable means on which said belt is mounted and which define a closed path for said belt including a portion at which strips are received between said spaced series and a portion remote therefrom, said revolvable means including two sets of rotating members coadjuting with said engageable elements, the members of one of said sets being spaced apart further than those of the other whereby to stretch said belt transversely as it moves from the strip receiving to the remote portion of said path.

7. In a machine of the character described, the combination, with a means for continuously forming sheeted dough into closely adjacent strips, of a transversely resiliently extensible endless belt having two transversely spaced series of engageable elements, revolvable means on which said belt is mounted and which define a closed path for said belt including a portion at which strips are received between said spaced series and a portion remote therefrom, said revolvable means including two sets of rotating members coadjuting with said engageable elements, the members of one of said sets being spaced apart further than those of the other whereby to stretch said belt transversely as it moves from the strip receiving to the remote portion of said path, the rotating members of each set which cooperate with the same series of engageable members having approximately parallel axes of revolution and being approximately coplanar.

8. In a machine of the character described, the combination, with a means for continuously forming sheeted dough into closely adjacent strips, of a transversely resiliently extensible endless belt having a series of apertures along each lateral edge thereof, two pairs of sprockets adapted to engage said apertures and defining a closed path for said belt, a portion of which is disposed beneath said strip forming means and a portion of which is remote therefrom, one pair of sprockets being spaced further apart than the other whereby to transversely stretch said belt as it moves away from beneath said strip forming means, a common support for the sprockets of each pair of sprockets which engage the same series of apertures, means to pivotally mount said common members adjacent said other pair of sprockets, and means to adjust the relative spacing of said one pair of sprockets.

9. An endless belt for spreading articles which are received closely spaced transversely to the movement of the belt, said belt comprising a series of transversely extending parallel helical springs, each lateral edge of said belt comprising a chain to which the ends of said springs are secured, two pairs of spaced sprockets engaging said chains and defining a closed path for said belt, one pair of said sprockets being spaced apart further than the other pair of sprockets to alternately transversely stretch and relax said springs as they move between said pairs of sprockets.

CESARE MALNATI.

REFERENCES CITED

The following references are of record in the file of this patent:

UNITED STATES PATENTS

| Number | Name | Date |
|---|---|---|
| 402,396 | Bryce et al. | Apr. 30, 1889 |
| 442,732 | Nuttall | Dec. 16, 1890 |
| 937,702 | Igou | Oct. 19, 1909 |
| 1,160,791 | Van Houten | Nov. 16, 1915 |
| 1,527,262 | Martin | Feb. 24, 1925 |
| 1,738,361 | De Vito | Dec. 3, 1929 |
| 1,775,505 | Baccellieri et al. | Sept. 9, 1930 |
| 1,938,110 | Neutelings | Dec. 5, 1933 |
| 1,985,275 | Baccellieri | Dec. 25, 1934 |
| 2,180,075 | Stout | Nov. 14, 1939 |
| 2,256,927 | Pittman | Sept. 23, 1941 |
| 2,357,085 | Cohen et al | Aug. 29, 1944 |

FOREIGN PATENTS

| Number | Country | Date |
|---|---|---|
| 522,967 | France | Apr. 11, 1921 |